United States Patent
Hirabayashi

(10) Patent No.: US 11,222,480 B2
(45) Date of Patent: Jan. 11, 2022

(54) DESIGNING ASSISTANCE SYSTEM, DESIGNING ASSISTANCE METHOD, AND COMPUTER READABLE MEDIUM

(71) Applicant: SUBARU CORPORATION, Tokyo (JP)

(72) Inventor: Daisuke Hirabayashi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 382 days.

(21) Appl. No.: 16/403,011

(22) Filed: May 3, 2019

(65) Prior Publication Data
US 2020/0035036 A1 Jan. 30, 2020

(30) Foreign Application Priority Data
Jul. 26, 2018 (JP) .............................. JP2018-140028

(51) Int. Cl.
| | |
|---|---|
| *G06F 30/13* | (2020.01) |
| *G06T 19/20* | (2011.01) |
| *G06F 30/15* | (2020.01) |
| *G06T 17/10* | (2006.01) |

(52) U.S. Cl.
CPC .............. *G06T 19/20* (2013.01); *G06F 30/15* (2020.01); *G06T 17/10* (2013.01)

(58) Field of Classification Search
CPC . G06T 19/20; G06T 17/10; G06T 2219/2021; G06F 30/15; G06F 30/17; G06F 30/23; G06F 2111/20; G06F 2119/18; G06F 30/13; G06F 17/30; G06F 17/5095; Y02P 90/02; G06Q 10/103; A43D 1/04; A61B 34/10
See application file for complete search history.

(56) References Cited

U.S. PATENT DOCUMENTS

2010/0262406 A1  10/2010  Goel et al.
2016/0019270 A1*  1/2016  Jones .................... G06F 16/248
                                                    700/98

FOREIGN PATENT DOCUMENTS

| CN | 101061897 A | * 10/2007 | |
| CN | 102625669 B | *  9/2015 | ............. A61B 34/10 |
| CN | 105157658 A | * 12/2015 | |

(Continued)

OTHER PUBLICATIONS

Thomas Stangl et al., "Feature Based Interpretation and Reconstruction of Structural Topology Optimization Results", DS 80-6 Proceedings of the 20th International Conference on Engineering Design (ICED 15) vol. 6: Design Methods and Tools—Part 2 Milan, Italy, Jul. 30, 2015 (Jul. 30, 2015), pp. 235-244.

(Continued)

*Primary Examiner* — Kandasamy Thangavelu
(74) *Attorney, Agent, or Firm* — McDermott Will & Emery LLP

(57) ABSTRACT

A designing assistance system includes an identification unit and a modification unit. The identification unit is configured to acquire a three-dimensional shape model of a structure, and identify a bar-shaped part of the three-dimensional shape model. The three-dimensional shape model is obtained through a topology optimization calculation. The modification unit is configured to cause the bar-shaped part of the three-dimensional shape model to be modified to an undented shape model.

17 Claims, 5 Drawing Sheets

(56) References Cited

FOREIGN PATENT DOCUMENTS

| CN | 106510099 A | * | 3/2017 | ............... A43D 1/04 |
| CN | 206192290 U | * | 5/2017 | |
| CN | 107844677 A | * | 3/2018 | ............. G06F 30/13 |
| JP | 2010-250818 A | | 11/2010 | |
| WO | WO2004104868 A1 | * | 7/2006 | ......... G06F 17/5095 |
| WO | WO 2013051080 A1 | * | 4/2013 | ........... G06Q 10/103 |

OTHER PUBLICATIONS

Shane Larsen et al., "Converting Topology Optimization Results into Parametric CAD Models" Computer-Aided Design and Applications, vol. 6, No. 3, Jan. 1, 2009 (Jan. 1, 2009), pp. 407-418.
N.D. Cornea et al., "Curve-Skeleton Properties, Applications, and Algorithms", IEEE Transactions on Visualization and Computer Graphics, IEEE Service Center, Los Alamitos, CA, US, vol. 13, No. 3, May 1, 2007 (May 1, 2007), pp. 530-548.
BaStein Durix et al., "Towards Skeleton Based Reconstruction: From Projective Skeletonization to Canal Surface Estimation", 2015 International Conference on 3D Vision, IEEE, Oct. 19, 2015 (Oct. 19, 2015), pp. 545-553.
Extended European Search Report issued in corresponding European Patent Application No. 19172259.4-1224, dated Nov. 6, 2019.
European Office Action issued in coresponding European Patent Application No. 19172259.4-1224, dated Sep. 1, 2021.

* cited by examiner

DESIGNING ASSISTANCE SYSTEM, DESIGNING ASSISTANCE METHOD, AND COMPUTER READABLE MEDIUM

CROSS-REFERENCE TO RELATED APPLICATIONS

The present application claims priority from Japanese Patent Application No. 2018-140028 filed on Jul. 26, 2018, the entire contents of which are hereby incorporated by reference.

BACKGROUND

The technology relates to a designing assistance system, a designing assistance method, and a computer readable medium that contains a designing assistance program.

Topology optimization has been known as one of techniques that optimize shapes upon designing various structures, such as aircraft parts or automobile parts. For example, reference is made to Japanese Unexamined Patent Application Publication No. 2010-250818. The topology optimization optimizes a density distribution of a material factor such as the number of holes or positions of the holes, and thus determines an optimal form of a structure. Structural analysis software directed to the topology optimization is available in the market, making it possible to calculate, as an optimal solution, shape data of any structure which is not readily imaginable by a designer.

SUMMARY

An aspect of the technology provides a designing assistance system that includes: an identification unit configured to acquire a three-dimensional shape model of a structure, and identify a bar-shaped part of the three-dimensional shape model, in which the three-dimensional shape model is obtained through a topology optimization calculation; and a modification unit configured to cause the bar-shaped part of the three-dimensional shape model to be modified to an undented shape model.

An aspect of the technology provides a designing assistance method that includes: preparing the designing assistance system according to any aspect of the technology; and creating a three-dimensional shape model of the structure that allows for formation of the structure, through causing, with the designing assistance system, the bar-shaped part of the three-dimensional shape model to be modified.

An aspect of the technology provides a designing assistance method that includes: acquiring a three-dimensional shape model of a structure, in which the three-dimensional shape model is obtained through a topology optimization calculation; identifying a bar-shaped part of the three-dimensional shape model; and creating a three-dimensional shape model of the structure that allows for formation of the structure, through causing the bar-shaped part of the three-dimensional shape model to be modified to an undented shape model.

An aspect of the technology provides a non-transitory computer readable medium that contains a designing assistance program. The designing assistance program causes, when executed by a computer, the computer to implement a method. The method includes: acquiring a three-dimensional shape model of a structure, in which the three-dimensional shape model is obtained through a topology optimization calculation; identifying a bar-shaped part of the three-dimensional shape model; and causing the bar-shaped part of the three-dimensional shape model to be modified to an undented shape model.

An aspect of the technology provides a designing assistance system that includes circuitry configured to acquire a three-dimensional shape model of a structure, in which the three-dimensional shape model is obtained through a topology optimization calculation, identify a bar-shaped part of the three-dimensional shape model, and cause the bar-shaped part of the three-dimensional shape model to be modified to an undented shape model.

DETAILED DESCRIPTION

Figure 1:
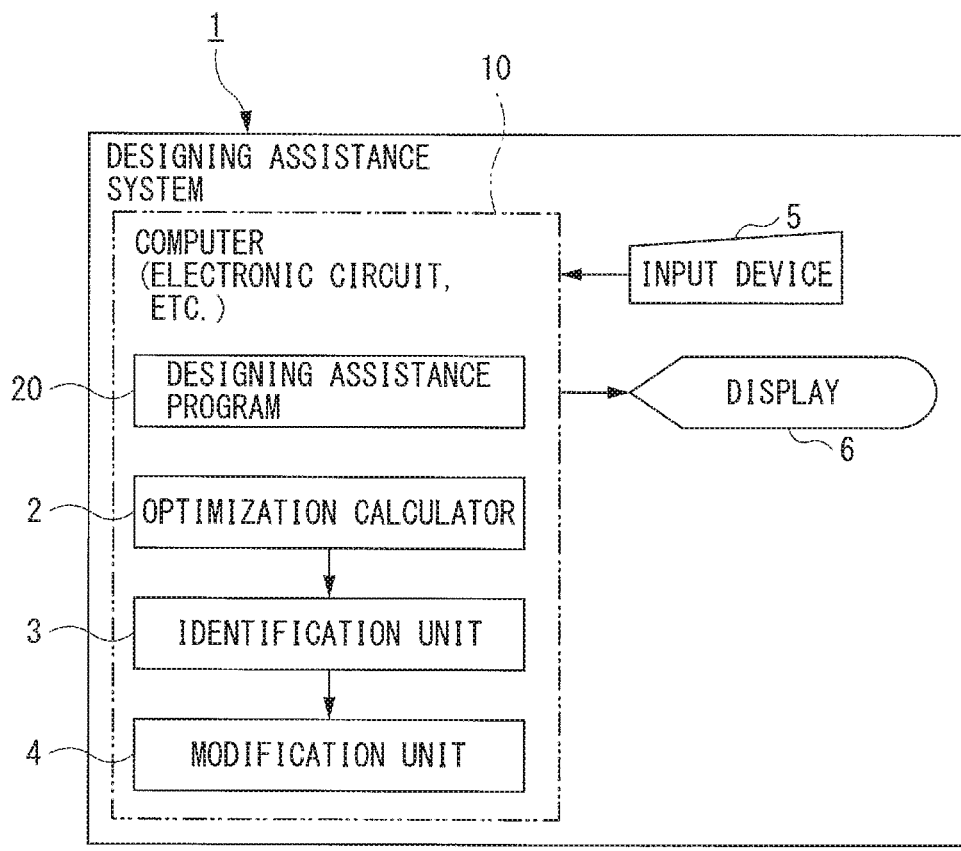
FIG. 1 is a diagram illustrating an example of a configuration of a designing assistance system according to one embodiment of the technology.

In the following, a designing assistance system, a designing assistance method, and a computer readable medium that contains a designing assistance program according to some example embodiments of the technology are described in detail with reference to the accompanying drawings. Note that the following description is directed to illustrative examples of the disclosure and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description.

Three-dimensional shape data outputted as a result of a topology optimization calculation sometimes contains a large number of fine irregularities, or sometimes contains a surface that is defined by a curved surface having a clearance due to an error. Such three-dimensional shape data does not allow for formation by a machining process or a die-based forming process, or even by a 3D printer that makes it possible to form a relatively-complex shape. In such a case, a designer is required to modify shape data of a structure through use of a three-dimensional computer-aided design (CAD) system or any other modifying technique.

It is desirable to provide a designing assistance system, a designing assistance method, and a computer readable medium containing a designing assistance program, that make it possible to easily obtain shape data of a structure by which formation is possible, on the basis of a data process that includes a topology optimization calculation.

[Exemplary Configuration and Operation of Designing Assistance System]

FIG. 1 is a diagram illustrating an example of a configuration of a designing assistance system according to an example embodiment of the technology.

A designing assistance system 1 according to an example embodiment may determine a shape of a structure, on the basis of a data process that modifies a three-dimensional shape model of the structure. The three-dimensional shape model is obtained by a topology optimization calculation. The designing assistance system 1 may itself perform the topology optimization calculation. In an alternative example embodiment, however, the designing assistance system 1 may be used in combination with an existing system that performs the topology optimization calculation.

FIG. 1 illustrates an example embodiment in which the designing assistance system 1 performs the topology optimization calculation. The designing assistance system 1 includes an identification unit 3 and a modification unit 4. The designing assistance system 1 may also include an optimization calculator 2, an input device 5, and a display 6.

The optimization calculator 2 may perform the topology optimization calculation and may thereby create a three-dimensional shape model of a structure. The optimization calculator 2 may use any ordinary technique to execute the topology optimization calculation.

The identification unit 3 acquires the three-dimensional shape model of the structure obtained by the topology optimization calculation, and identifies a bar-shaped part of the three-dimensional shape model. The identification unit 3 may automatically identify the bar-shaped part through use of a data process. In an alternative example embodiment, however, a user may operate the input device 5 to identify the bar-shaped part manually. In the example embodiment in which the identification of the bar-shaped part is to be performed on the basis of an operation performed on the input device 5, the display 6 may display a two-dimensional image that represents the three-dimensional shape model of the structure obtained by the topology optimization calculation. Non-limiting examples of the two-dimensional image may include a volume rendering image and a projection image.

The modification unit 4 causes the three-dimensional shape model that represents the bar-shaped part identified by the identification unit 3 to be modified to an undented shape model or a less-dented shape model. Thus, the three-dimensional shape model, following the modification (hereinafter sometimes referred to simply as a "modified three-dimensional shape model"), of the bar-shaped part performed by the modification unit 4 may be suited for manufacturing. In one example embodiment, the undented shape model may be a shape model having a transverse-sectional shape that is an ellipse or a polygon. Such one example embodiment makes simple in shape the three-dimensional shape model that represents the bar-shaped part, and further facilitates the manufacturing accordingly. In an alternative example embodiment, however, the transverse-sectional shape may be a circle as a type of the ellipse, or may be a regular polygon. Note that the polygon can be a figure in which three or more points, different from each other on a plane, are connected by line segments and which is surrounded by a closed polygonal chain.

The undented shape model, following the modification, that represents the bar-shaped part may be created as a solid model defined by a mathematical expression. Creating the modified shape model in the form of the solid model makes it possible to allow a shape model, before the modification (hereinafter sometimes referred to simply as a "unmodified shape model"), to be modified to a manufacturable shape model, even in a case where such an unmodified shape model includes a surface that has a clearance or intersecting planes generated due to a calculation error.

The three-dimensional shape model that represents the bar-shaped part, modified by the modification unit 4, may be outputted as output data of the designing assistance system 1. The three-dimensional shape model may be outputted, as the output data, together with a shape model that represents a part other than the bar-shaped part. In one example embodiment where the shape models representing the respective bar-shaped parts are to be modified, the identification of any bar-shaped part performed by the identification unit 3 and the modification, performed by the modification unit 4, of the shape model representing the identified bar-shaped part may be repeatedly executed. In such one example embodiment, the modified shape models representing all of the bar-shaped parts and the shape model representing the part other than the bar-shaped part may be outputted as the output data of the designing assistance system 1.

The shape model of the structure, serving as the output data of the designing assistance system 1, may be used as design information of a structure. For example, the shape model of the structure may be used for manufacturing purpose. In one example embodiment, the shape model of the structure may be utilized as input data of the 3D printer, or may be utilized as a three-dimensional CAD data directed to die making or to a numerical control (NC) machining.

In one example embodiment, an electronic circuit structuring a computer 10 may read a designing assistance program 20 to thereby structure the designing assistance system 1. Non-limiting examples of the electronic circuit may include a controller and a processor. The designing assistance program 20 causes the computer 10 to execute a method that includes: identifying the bar-shaped part of the three-dimensional shape model through acquiring the three-dimensional shape model of the structure obtained by the topology optimization calculation; and causing the three-dimensional shape model that represents the bar-shaped part to be modified to the undented shape model.

The designing assistance program 20 may be distributed as a program product. In one example embodiment, the designing assistance program 20 may be recorded in an information recording medium or a computer readable medium to allow the computer 10 to be utilized as the designing assistance system 1. The computer 10 can be a general-purpose computer or a dedicated computer. In alternative example embodiment, however, the designing assistance program may be downloaded onto the computer 10 through a network, with or without involving the use of the information recording medium or the computer readable medium.

[Designing Assistance Method that Uses Designing Assistance System]

A description is given next of a designing assistance method according to the example embodiment. In one example embodiment, the designing assistance method may use the designing assistance system 1.

Figure 2:
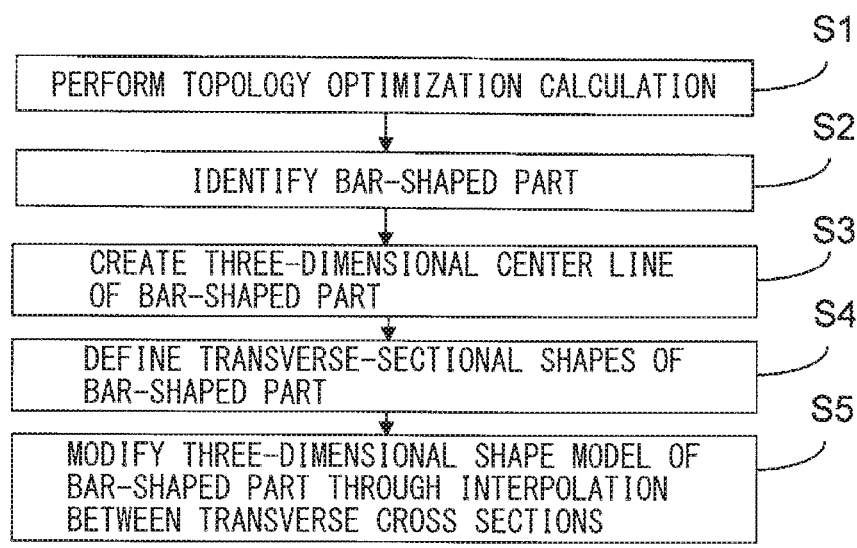
FIG. 2 is a flowchart illustrating an example of a flow upon designing a shape of a structure on the basis of the designing assistance system illustrated in FIG. 1.

FIG. 2 is a flowchart illustrating an example of a flow upon designing a shape of a structure on the basis of the designing assistance system 1 illustrated in FIG. 1.

First, at step S1, the optimization calculator 2 may perform the topology optimization calculation of the three-dimensional shape of the structure that serves as a target to be designed and/or manufactured. Input data for the topology optimization calculation may contain a design region and constraints. The design region may be defined as a space that excludes an interference region, and may be equivalent to a boundary condition. Non-limiting examples of the boundary condition may include a position at which any adjacent component comes into contact. The input data may contain constraints such as, but not limited to, a distribution of external load, a material property, quality of material, a mechanical characteristic, or a fastener position. Further, parameters to be subjected to the optimization may be determined on an as-needed basis in accordance with a design purpose. For example, the optimization calculation may be performed that minimizes the parameters such as a deformation amount, stress, or volume. An initial shape before the optimization may be defined to execute the optimization calculation as well.

The structure to be designed and/or manufactured may be fabricated by any desired manufacturing method. Non-limiting examples of the manufacturing method may include: machining; casting; 3D printer molding; die molding such as pultrusion or extrusion; plastic injection molding; and a composite molding that uses a molding jig. The composite molding may form a composite such as a glass fiber reinforced plastic (GFRP) or a carbon fiber reinforced plastic (CFRP). Accordingly, any structure made of a desired material and based on a manufacturing method may be designed and/or manufactured. In other words, any shape of the structure made of a plastic, a composite, or a metal such as aluminum, magnesium, or titanium, may be subjected to the topology optimization calculation to thereby obtain an output solution of the topology optimization calculation.

Figure 3:
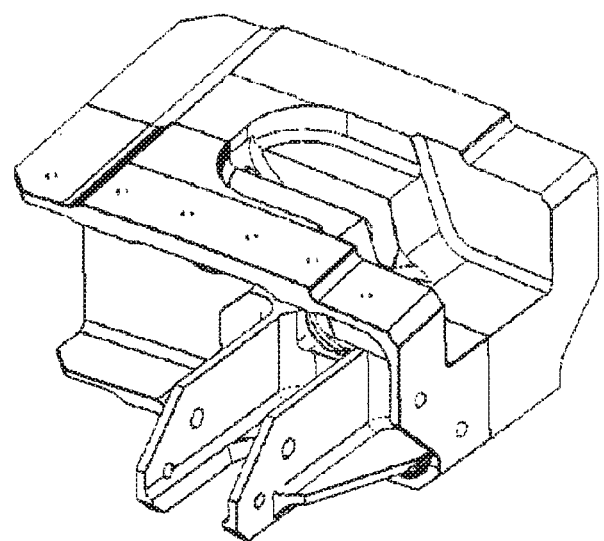
FIG. 3 is a perspective view of an exemplary shape, as a base, that serves as input data for a topology optimization calculation.
Figure 4:
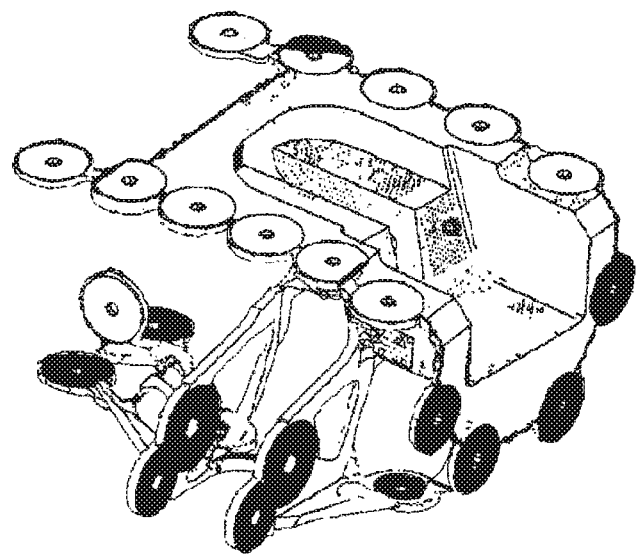
FIG. 4 is a perspective view of an exemplary three-dimensional shape data outputted as a result of the topology optimization calculation that is based on the input data related to the base shape illustrated in FIG. 3.

FIG. 3 is a perspective view of an exemplary shape, as a base, that serves as the input data for the topology optimization calculation. FIG. 4 is a perspective view of an exemplary three-dimensional shape data outputted as a result of the topology optimization calculation that is based on the input data related to the base shape illustrated in FIG. 3.

Referring by way of example to FIG. 3, the input data for the topology optimization calculation may be based on a model having a shape that corresponds to the design region. Performing the topology optimization calculation on the basis of such input data obtains a shape model as illustrated by way of example in FIG. 4. The shape model obtained as a result of the topology optimization calculation may comply with constraints, such as a faster position as illustrated in FIG. 4.

The shape model resulting from the topology optimization calculation may be structured by three-dimensional point-group data, and may contain the shape model that corresponds to the bar-shaped part. The shape model corresponding to the bar-shaped part, however, may sometimes be unsuitable for manufacturing if the shape model is used as it is. For example, the shape model corresponding to the bar-shaped part may be unsuitable for manufacturing upon presence of a large number of dents, intersecting surfaces, or a surface having a clearance. Accordingly, the designing assistance system 1 may execute a data process that modifies the three-dimensional shape model that represents the bar-shaped part out of the three-dimensional shape model that is obtained as a result of the topology optimization calculation. The data process may cause the three-dimensional shape model representing the bar-shaped part to be modified to the undented shape model and may thereby create the three-dimensional shape model of the structure that allows for formation.

To execute the data process, at step S2, the identification unit 3 acquires the three-dimensional shape model of the structure obtained by the topology optimization calculation, and identifies the bar-shaped part of the three-dimensional shape model. In one example embodiment, the identification of the bar-shaped part may be performed manually through the operation performed on the input device 5. In an alternative example embodiment, however, the identification of the bar-shaped part may be performed automatically through an image process.

For example, in one example embodiment where the bar-shaped part is to be identified manually through operating the input device 5, the display 6 may display the three-dimensional shape model based on the two-dimensional image such as the volume rendering image or the projection image. Further, in such one example embodiment, the input device 5 may be operated to specify positions of respective both ends of the bar-shaped part on the two-dimensional image to thereby identify the bar-shaped part. The input device 5 may be a mouse or any other input device operable to specify any position of the bar-shaped part on the image. In one example embodiment where the bar-shaped part is to be identified automatically, any desired image process may be performed to identify the single bar-shaped part or the plurality of bar-shaped parts. For example, the image process may be a threshold process that extracts, from the three-dimensional shape model, a part having a thickness (a size) that is equal to or less than a predetermined threshold.

Thereafter, at step S3, the modification unit 4 may determine a three-dimensional (3D) center line of the three-dimensional shape model that represents the bar-shaped part. To determine the three-dimensional center line, the modification unit 4 may execute an image process that projects, onto two projection planes that are not parallel with each other, the unmodified three-dimensional shape model that represents the bar-shaped part. By projecting the unmodified three-dimensional shape model onto the two projection planes, the image process may acquire two-dimensional contours that represent respective shapes of the bar-shaped part on the respective two projection planes.

Figure 5:
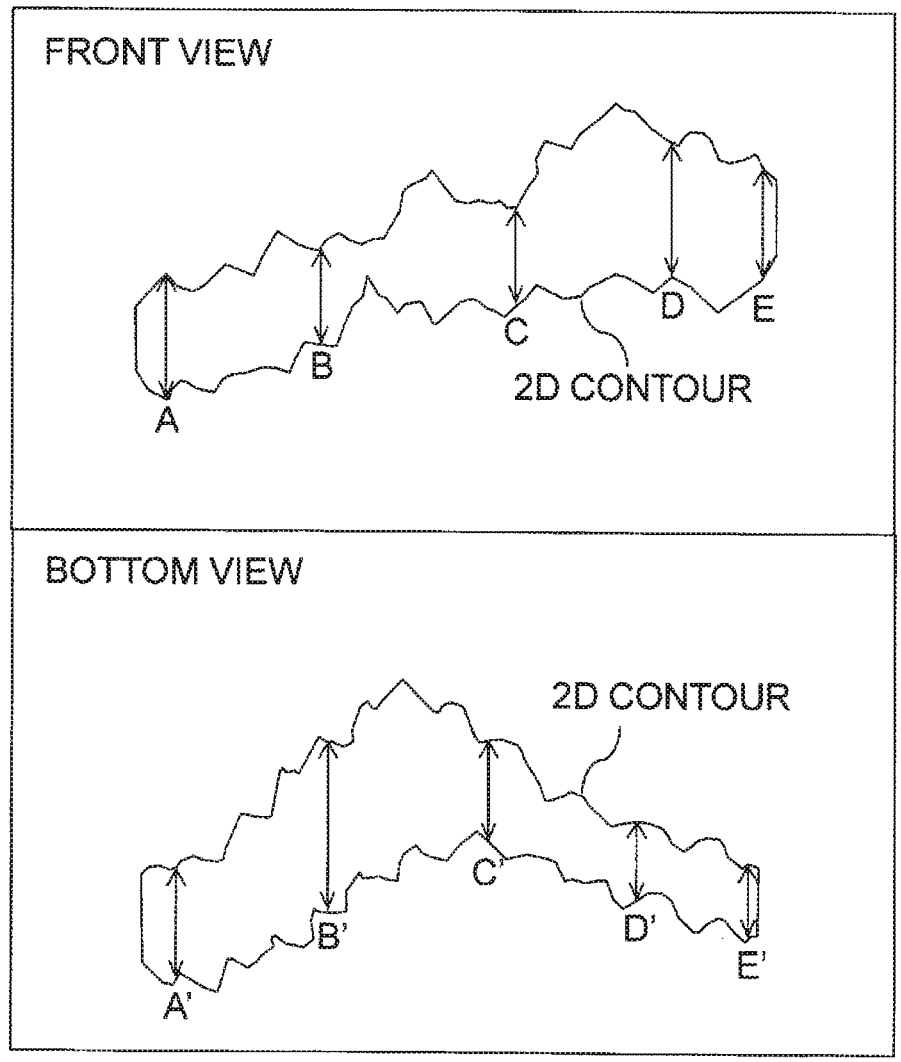
FIG. 5 is a diagram illustrating an example of two-dimensional contours that are obtained as a result of projection, onto each of a front projection plane and a bottom projection plane, of a three-dimensional shape model of a bar-shaped part of the structure obtained by the topology optimization calculation.

FIG. 5 illustrates an example of two-dimensional contours that are obtained as a result of projection, onto each of the front projection plane and the bottom projection plane, of the three-dimensional shape model of the bar-shaped part of the structure obtained by the topology optimization calculation.

Referring by way of example to FIG. 5, projecting the three-dimensional shape model that represents the bar-shaped part onto each of the front projection plane and the bottom projection plane obtains the two-dimensional contours on the respective projection planes. In one example embodiment, the three-dimensional shape model may be projected onto the two projection planes that are orthogonal to each other. In an alternative example embodiment, however, the three-dimensional shape model may be projected onto the two projection planes that are not orthogonal to each other to thereby obtain the two-dimensional contours.

Thus obtaining the two-dimensional contours that represent the bar-shaped part allows for calculation of a thickness (a size) of the bar-shaped part at each of positions A, B, C, D, E, A', B', C', D', and E' as illustrated in FIG. 5. In other words, it is possible to calculate a distance between two-dimensional contour lines. These positions may be determined at appropriate intervals. If the interval between the positions at which the respective thicknesses of the two-dimensional contours representing the bar-shaped part are to be calculated is narrowed, an accuracy of the modified three-dimensional shape model that represents the bar-shaped part improves. On the other hand, narrowing the interval between the positions can result in an increase in data processing. Accordingly, the interval between the positions at which the respective thicknesses of the two-dimensional contours are to be calculated may be determined on the basis of the accuracy required for the modified three-dimensional shape model that represents the bar-shaped part.

Thus calculating the thickness of the bar-shaped part at each of the positions A, B, C, D, E, A', B', C', D', and E' on each of the projection planes makes it possible to obtain, on each of the projection planes, a two-dimensional (2D) center line of the bar-shaped part. The two-dimensional center lines each may be a curve line that passes through the center of the bar-shaped part at each of the positions A, B, C, D, E, A', B', C', D', and E'. By obtaining the two-dimensional center lines of the bar-shaped part on the respective projection planes, it is possible to determine the three-dimensional center line of the bar-shaped part.

Figure 6:
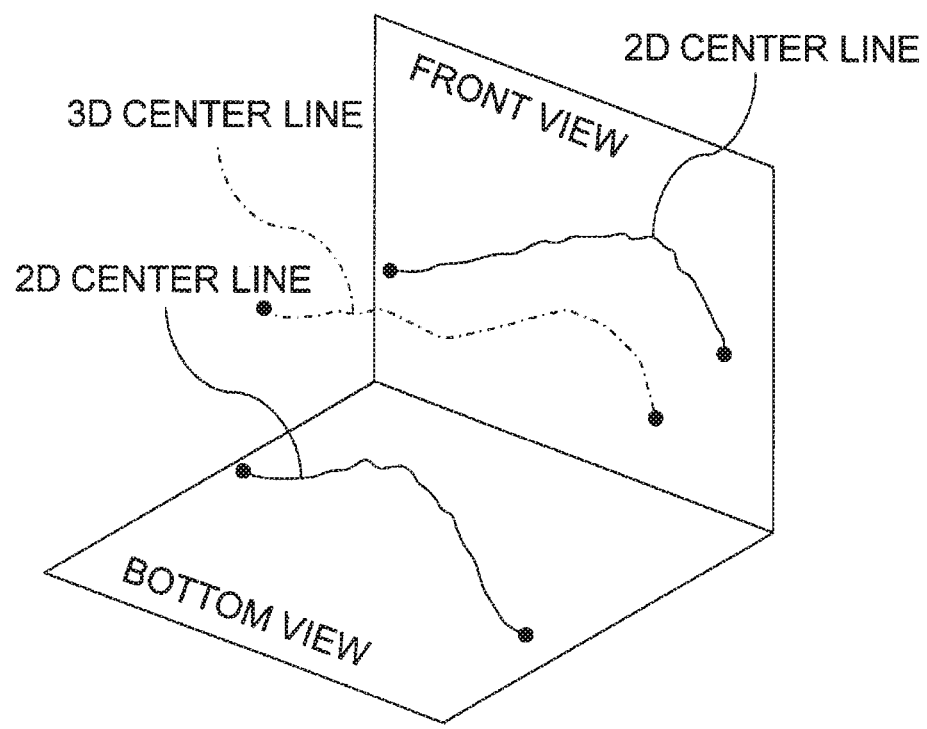
FIG. 6 is a diagram illustrating an exemplary technique of determining a three-dimensional center line of the bar-shaped part, on the basis of center lines of the respective two two-dimensional contours acquired on the projection planes illustrated in FIG. 5.

FIG. 6 illustrates an exemplary technique of determining the three-dimensional center line of the bar-shaped part, on the basis of the center lines of the respective two two-dimensional contours acquired on the projection planes illustrated in FIG. 5.

Referring to FIG. 6, the two-dimensional center lines of the bar-shaped part may be obtained on the respective front and the bottom projection planes as denoted by respective solid lines. The two-dimensional center lines each may be created as an approximate curve that passes through the center, or near the center, of the bar-shaped part at each of the positions A, B, C, D, E, A', B', C', D', and E'. The two-dimensional center lines each may be created using curve fitting, or any other technique, that uses a spline curve and/or a higher-order curve.

When the two-dimensional center lines are created on the respective projection planes, such two two-dimensional center lines may be subjected to back projection to thereby create the three-dimensional center line of the bar-shaped part denoted by a chain line illustrated in FIG. 6.

Thereafter, at step S4, the modification unit 4 may determine cross-sectional shapes of the modified three-dimensional shape model that represents the bar-shaped part. The transverse-sectional shapes of the modified three-dimensional shape model of the bar-shaped part may be defined on the basis of the thicknesses of the bar-shaped part, on the respective projection planes, represented by the two two-dimensional contours as illustrated in FIG. 5.

Figure 7:
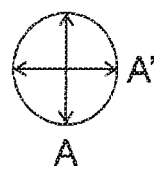
FIG. 7 is a diagram illustrating an example in which transverse-sectional shapes of the bar-shaped part are each defined by an ellipse, on the basis of thicknesses of the bar-shaped part on the projection planes illustrated in FIG. 5.
Figure 7:
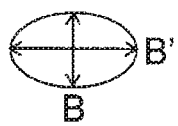
Figure 7:
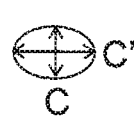
Figure 7:
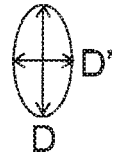
Figure 7:
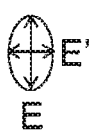
Figure 8:
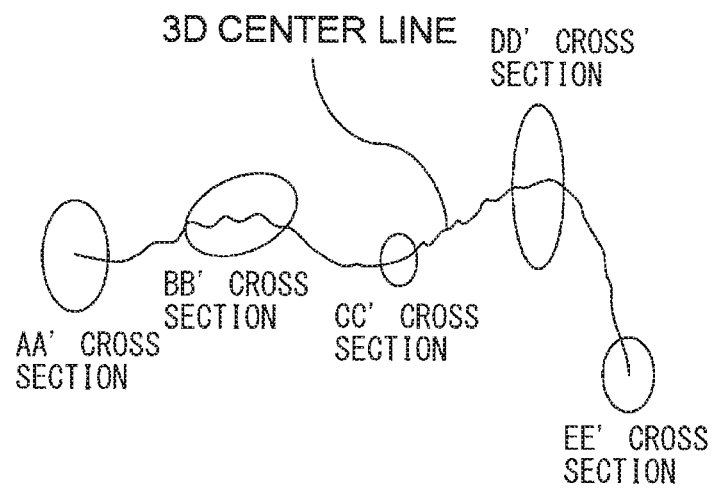
FIG. 8 is a diagram illustrating an example in which the transverse-sectional shapes of the bar-shaped part defined as illustrated in FIG. 7 are disposed along the three-dimensional center line of the bar-shaped part.

FIG. 7 illustrates an example in which the transverse-sectional shapes of the bar-shaped part are each defined by an ellipse, on the basis of the thicknesses of the bar-shaped part on the projection planes illustrated in FIG. 5. FIG. 8 illustrates an example in which the transverse-sectional shapes of the bar-shaped part defined as illustrated in FIG. 7 are disposed along the three-dimensional center line of the bar-shaped part.

Referring to FIG. 7, the transverse-sectional shapes of the bar-shaped part each may be defined by an ellipse whose major axis or minor axis corresponds to the thickness of the bar-shaped part on the two projection planes at each of the positions A, B, C, D, E, A', B', C', D', and E'. This configuration simplifies the transverse-sectional shapes of the bar-shaped part that correspond to the respective positions A, B, C, D, E, A', B', C', D', and E'.

In one example embodiment, any simple shape other than the ellipse may be used to simplify the transverse-sectional shapes of the bar-shaped part. For example, a circle as a type of the ellipse or a polygon, such as a rectangle or a regular polygon, may be used to define the transverse-sectional shapes of the bar-shaped part. In one example embodiment where the transverse-sectional shapes of the bar-shaped part are to be defined on the basis of the circle or the polygon, a diameter of the circle or a width of the polygon may be so determined that a difference between a thickness of the bar-shaped part on the projection planes and the diameter of the circle or between the thickness of the bar-shaped part on the projection planes and the width of the polygon becomes minimum. For example, in a case in which the transverse-sectional shapes of the bar-shaped part are to be defined on the basis of circle, a circle having a diameter that is based on an average value or a maximum value of the thicknesses of the bar-shaped part on the two projection planes may be used to define the transverse-sectional shapes of the bar-shaped part.

Thereafter, at step S5, the modification unit 4 may create the modified three-dimensional shape model of the bar-shaped part. The modified three-dimensional shape model of the bar-shaped part may be defined on the basis of the three-dimensional center line and the transverse-sectional shapes of the bar-shaped part.

Figure 9:
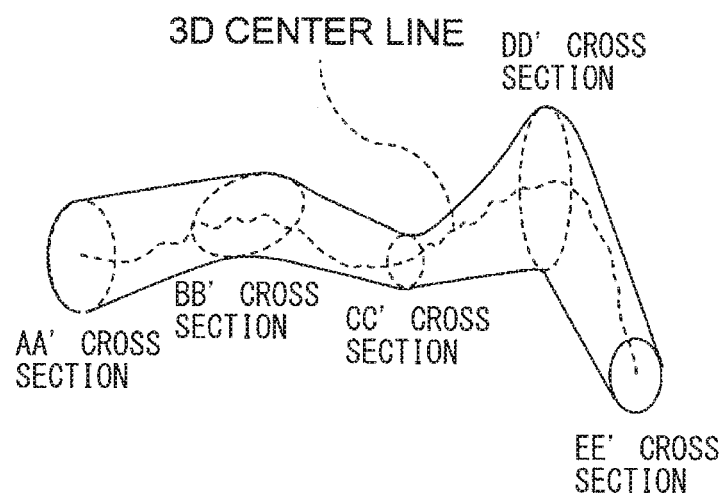
FIG. 9 is a diagram illustrating an example in which a modified three-dimensional shape model of the bar-shaped part is created on the basis of planes passing through the ellipses that are along the three-dimensional center line illustrated in FIG. 8.

FIG. 9 illustrates an example in which the modified three-dimensional shape model of the bar-shaped part is created on the basis of planes passing through the ellipses that are along the three-dimensional center line illustrated in FIG. 8.

Referring to FIG. 9, the modified three-dimensional shape model of the bar-shaped part may be created on the basis of the planes that pass through the ellipses. The ellipses may be defined as the transverse-sectional shapes of the bar-shaped part as described above. In one example embodiment where the transverse-sectional shapes of the bar-shaped part are shapes other than the ellipse, planes that passes through contours of transverse cross sections of the bar-shaped part may be defined to thereby create the modified three-dimensional shape model of the bar-shaped part.

Any technique may be employed to create the planes that pass through the contours of the transverse cross sections. In one example embodiment where the transverse-sectional shape is ellipse, an interpolation process may be performed to create the modified three-dimensional shape model that is smooth and free from edges except for its both ends. The interpolation process may be based on parameters including a length of the major axis of the ellipse, a length of the minor axis of the ellipse, and an inclination angle. In an alternative example embodiment, a technique may be employed in which points on the contours of the respective transverse cross sections are coupled to each other between the mutually-adjacent transverse cross sections by straight lines or curves, and in which a flat surface or a curved surface may be created that passes through the straight lines or the curves that couple the points on the contours of the respective transverse cross sections together.

The thus-created modified three-dimensional shape model is created as a result of coupling the contours of the undented transverse cross sections, making it possible to obtain the undented three-dimensional shape model. Accordingly, in one example embodiment, the modification unit 4 may create the undented three-dimensional shape model through executing: a process that creates the center lines of the bar-shaped part on the basis of the unmodified three-dimensional shape model that represents the bar-shaped part; a process that defines the shapes of the transverse cross sections of the bar-shaped part on the basis of the created center lines; and a process that creates planes that pass through edges of the transverse cross sections.

The modified, undented three-dimensional shape model is suited as the manufacturable three-dimensional shape model of the structure. Hence, in one example embodiment, the modified three-dimensional shape model may be utilized as the input data of the 3D printer, or may be utilized as the input data for the CAD system directed to die making or to machining of the structure. In particular, the modified three-dimensional shape model has a simple shape expressible by a mathematical function. Accordingly, it is also possible to create, as solid data that defines a region by a mathematical function, the modified three-dimensional shape model having a shape of only protrusions. Hence, unlike a three-dimensional shape model structured by point-group data and/or surface data, it is possible to prevent a concern related to generation of the three-dimensional shape model, such as generation of the three-dimensional shape model including the surface that has the clearance or including the intersecting surfaces due to a calculation error.

Note that as the number of positions, at which the thickness of the bar-shaped part is to be calculated, on the projection planes increases as illustrated in FIG. 5, the number of transverse cross sections increases, thus making it possible to create the three-dimensional shape model that is smoother and higher in accuracy. In contrast, the number of transverse cross sections decreases as the number of positions, at which the thickness of the bar-shaped part is to be calculated, on the projection planes decreases. In this case, the three-dimensional shape model can become rough in surface, but allows for a reduction in data processing.

Accordingly, in one example embodiment, a process may be performed that optimizes the positions on the projection planes at which the thicknesses of the bar-shaped part are to be calculated, such that a surface roughness of the modified three-dimensional shape model falls within an allowable range. In such one example embodiment, the modification unit 4 may automatically determine the positions on the projection planes at which the thicknesses of the bar-shaped part are to be calculated. In an alternative example embodiment, however, a user may operate the input device 5 to thereby manually determine the positions on the projection planes at which the thicknesses of the bar-shaped part are to be calculated.

[Example Effects]

The designing assistance system 1, the designing assistance method, and the computer readable medium that contains the designing assistance program 20 according to the foregoing example embodiment causes the shape of the model of the bar-shaped member, out of the three-dimensional shape model outputted as a result of the topology optimization calculation, to be modified to the undented, simplified shape and thereby redefines the shape of the model of the bar-shaped member.

Hence, the designing assistance system 1, the designing assistance method, and the computer readable medium that contains the designing assistance program 20 according to the foregoing example embodiment make it possible to reduce an operation to be performed by a user. For example, it is possible to reduce an operation required for a user to cause the shape of the three-dimensional shape model, outputted as a result of the topology optimization calculation, to be modified to a manufacturable shape through use of CAD software or any other technique.

Accordingly, it is possible to provide the designing assistance system, the designing assistance method, and the computer readable medium containing the designing assistance program, that make it possible to easily obtain the shape data of the structure by which formation is possible, on the basis of a data process that includes the topology optimization calculation.

[Other Embodiments]

Although some example embodiments of the technology have been described in the foregoing, the example embodiments described above are merely illustrative and should not be construed as limiting the scope of the technology. The novel method and apparatus described herein as example embodiments of the technology may be embodied in the form of any other embodiment. Further, it should be appreciated that various omissions, modifications, and alterations may be made to example embodiments of the technology described herein without departing from the scope as defined by the appended claims. The appended claims and equivalents are intended to encompass such omissions, modifications, and alterations as various embodiments and modification examples of the technology in so far as they fall within the scope of the appended claims or the equivalents thereof.

The computer 10 (or the electronic circuit) illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the computer 10. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the computer 10 illustrated in FIG. 1.

The invention claimed is:

1. A designing assistance system comprising:
an identification unit configured to acquire a three-dimensional shape model of a structure, and identify a bar-shaped part of the three-dimensional shape model, the three-dimensional shape model being obtained through a topology optimization calculation; and
a modification unit configured to cause the bar-shaped part of the three-dimensional shape model to be modified to an undented shape model.

2. The designing assistance system according to claim 1, wherein the modification unit is configured to create, as the undented shape model, a shape model defined by a mathematical expression.

3. The designing assistance system according to claim 2, wherein the modification unit is configured to create, as the undented shape model, a shape model having a transverse cross section whose shape is an ellipse or a polygon.

4. The designing assistance system according to claim 2, wherein, to create the undented shape model, the modification unit is configured to: create a center line of the bar-shaped part on a basis of the bar-shaped part of the unmodified three-dimensional shape model that is before the modification performed by the modification unit; define a shape of a transverse cross section of the bar-shaped part on a basis of the created center line; and create a plane that passes through an edge of the transverse cross section.

5. The designing assistance system according to claim 4, wherein the modification unit is configured to: project, onto two projection planes that are not parallel with each other, the bar-shaped part of the unmodified three-dimensional shape model that is before the modification performed by the modification unit and thereby acquire two-dimensional contours that represent, on the respective two projection planes, a shape of the bar-shaped part; and determine the center line of the bar-shaped part on a basis of center lines of the acquired respective two two-dimensional contours.

6. The designing assistance system according to claim 5, wherein the modification unit is configured to define the shape of the transverse cross section of the bar-shaped part on a basis of thicknesses of the bar-shaped part, the thicknesses of the bar-shaped part being expressed as the two two-dimensional contours.

7. The designing assistance system according to claim 2, further comprising an optimization calculator configured to perform the topology optimization calculation and thereby create the three-dimensional shape model of the structure.

8. A designing assistance method comprising:
creating a three-dimensional shape model of the structure that allows for formation of the structure, through causing, with the designing assistance system of claim 2, the bar-shaped part of the three-dimensional shape model to be modified.

9. The designing assistance system according to claim 1, wherein the modification unit is configured to create, as the undented shape model, a shape model having a transverse cross section whose shape is an ellipse or a polygon.

10. The designing assistance system according to claim 1, wherein, to create the undented shape model, the modification unit is configured to: create a center line of the bar-shaped part on a basis of the bar-shaped part of the unmodified three-dimensional shape model that is before the modification performed by the modification unit; define a shape of a transverse cross section of the bar-shaped part on a basis of the created center line; and create a plane that passes through an edge of the transverse cross section.

11. The designing assistance system according to claim 10, wherein the modification unit is configured to: project, onto two projection planes that are not parallel with each other, the bar-shaped part of the unmodified three-dimensional shape model that is before the modification performed by the modification unit and thereby acquire two-dimensional contours that represent, on the respective two projection planes, a shape of the bar-shaped part; and determine the center line of the bar-shaped part on a basis of center lines of the acquired respective two two-dimensional contours.

12. The designing assistance system according to claim 11, wherein the modification unit is configured to define the shape of the transverse cross section of the bar-shaped part on a basis of thicknesses of the bar-shaped part, the thicknesses of the bar-shaped part being expressed as the two two-dimensional contours.

13. The designing assistance system according to claim 1, further comprising an optimization calculator configured to perform the topology optimization calculation and thereby create the three-dimensional shape model of the structure.

14. A designing assistance method comprising:
creating a three-dimensional shape model of the structure that allows for formation of the structure, through causing, with the designing assistance system of claim 1, the bar-shaped part of the three-dimensional shape model to be modified.

15. A designing assistance method comprising:
acquiring a three-dimensional shape model of a structure, the three-dimensional shape model being obtained through a topology optimization calculation;
identifying a bar-shaped part of the three-dimensional shape model; and
creating a three-dimensional shape model of the structure that allows for formation of the structure, through causing the bar-shaped part of the three-dimensional shape model to be modified to an undented shape model.

16. A non-transitory computer readable medium containing a designing assistance program, the designing assistance program causing, when executed by a computer, the computer to implement a method, the method comprising:
acquiring a three-dimensional shape model of a structure, the three-dimensional shape model being obtained through a topology optimization calculation;
identifying a bar-shaped part of the three-dimensional shape model; and
causing the bar-shaped part of the three-dimensional shape model to be modified to an undented shape model.

17. A designing assistance system comprising
circuitry configured to
acquire a three-dimensional shape model of a structure, the three-dimensional shape model being obtained through a topology optimization calculation,
identify a bar-shaped part of the three-dimensional shape model, and
cause the bar-shaped part of the three-dimensional shape model to be modified to an undented shape model.

* * * * *